US008625538B2

(12) United States Patent
Kim et al.

(10) Patent No.: US 8,625,538 B2
(45) Date of Patent: Jan. 7, 2014

(54) METHOD AND APPARATUS FOR ASSOCIATION CONTROL IN MOBILE WIRELESS NETWORKS

(75) Inventors: Minkyong Kim, Yorktown Heights, NY (US); Zhen Liu, Tarrytown, NY (US); Srinivasan Parthasarathy, Yorktown, Heights, NY (US); Dimitrios Pendarakis, Wesport, CT (US); Hao Yang, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1103 days.

(21) Appl. No.: 11/939,332

(22) Filed: Nov. 13, 2007

(65) Prior Publication Data

US 2009/0122760 A1 May 14, 2009

(51) Int. Cl.
*H04W 4/00* (2009.01)

(52) U.S. Cl.
USPC .......................................... 370/332; 370/345

(58) Field of Classification Search
None
See application file for complete search history.

(56) References Cited

U.S. PATENT DOCUMENTS

| 7,120,136 | B2 * | 10/2006 | Upp et al. ..................... 370/331 |
| 7,149,193 | B2 * | 12/2006 | Fong et al. ..................... 370/328 |
| 7,161,915 | B2 * | 1/2007 | Womack et al. ............. 370/332 |
| 7,173,923 | B2 | 2/2007 | Beach |
| 7,206,610 | B2 * | 4/2007 | Iacono et al. ............... 455/562.1 |
| 7,257,105 | B2 * | 8/2007 | Molteni et al. ................ 370/338 |
| 7,315,743 | B1 * | 1/2008 | Frank et al. ................... 455/446 |
| 7,342,906 | B1 * | 3/2008 | Calhoun ........................ 370/338 |
| 7,561,546 | B2 * | 7/2009 | Marinier et al. .............. 370/329 |
| 7,716,740 | B2 * | 5/2010 | Robert et al. ................... 726/23 |
| 7,835,742 | B2 * | 11/2010 | Jaakkola et al. .............. 455/436 |
| 2001/0024953 | A1 * | 9/2001 | Balogh .......................... 455/432 |
| 2002/0001290 | A1 | 1/2002 | Bender et al. |
| 2003/0142647 | A1 * | 7/2003 | Agrawal et al. ............... 370/331 |
| 2004/0066757 | A1 * | 4/2004 | Molteni et al. ................ 370/329 |
| 2004/0125775 | A1 * | 7/2004 | Rios ............................... 370/338 |
| 2004/0198220 | A1 | 10/2004 | Whelan et al. |
| 2005/0030964 | A1 * | 2/2005 | Tiedemann et al. .......... 370/431 |
| 2005/0078624 | A1 * | 4/2005 | Shu et al. ....................... 370/328 |
| 2005/0135295 | A1 * | 6/2005 | Walton et al. ................. 370/328 |

(Continued)

FOREIGN PATENT DOCUMENTS

| CN | 1875644 | 12/2006 |
| CN | 101043746 | 9/2007 |

OTHER PUBLICATIONS

English Abstract for Publication No. CN 1875644.
English Abstract for Publication No. CN 101043746.

(Continued)

*Primary Examiner* — Marsha D Banks Harold
*Assistant Examiner* — Hooman Houshmand
(74) *Attorney, Agent, or Firm* — F. Chau & Associates, LLC; William J. Stock, Esq.

(57) ABSTRACT

A method for association of a mobile terminal with an access point (AP) includes determining a set of available APs. The AP from among the available APs that has the coverage area that is likely to encompass the mobile terminal for the greatest period of time or distance is selected. The selected AP is associated with the mobile terminal.

5 Claims, 7 Drawing Sheets

| | SLOT 1 | SLOT 2 | SLOT 3 | SLOT 4 | SLOT 5 | SLOT 6 | SLOT 7 | SLOT 8 | SLOT 9 |
|---|---|---|---|---|---|---|---|---|---|
| AP1 | X | [X] | [X] | | | | | | |
| AP2 | [X] | | | | | | | | |
| AP3 | X | X | | | | | | | |
| AP4 | X | X | | | | | X | X | X |
| AP5 | X | | | | | | | | |
| AP6 | | X | X | [X] | [X] | | X | X | |
| AP7 | | | | X | X | [X] | [X] | [X] | [X] |
| AP8 | | | | X | X | | | | |
| AP9 | | X | X | X | | | | | |
| AP10 | | | | | X | X | | X | X |
| AP11 | | | | | | X | | | X |
| AP12 | | | | | X | X | | | |
| MARK | * | | | * | | | | | |

(56) References Cited

U.S. PATENT DOCUMENTS

| | | |
|---|---|---|
| 2005/0135316 A1 | 6/2005 | Cromer et al. |
| 2005/0195767 A1* | 9/2005 | Rahman ................. 370/331 |
| 2005/0213579 A1* | 9/2005 | Iyer et al. ............. 370/395.2 |
| 2005/0271012 A1* | 12/2005 | Agrawal et al. ......... 370/331 |
| 2006/0067214 A1* | 3/2006 | Ramachandran ......... 370/229 |
| 2006/0078123 A1* | 4/2006 | Bichot et al. ............. 380/270 |
| 2006/0256763 A1 | 11/2006 | Nguyen et al. |
| 2007/0025334 A1 | 2/2007 | Meyer |
| 2008/0222294 A1* | 9/2008 | Liang ..................... 709/227 |
| 2009/0034443 A1* | 2/2009 | Walker et al. ............ 370/311 |

OTHER PUBLICATIONS

Punit Ahluwalia, et al., "Managing End-To-End Quality of Service in Multiple Heterogeneous Wireless Networks," International Journal of Network Management, Int. J. Network Mgmt 2007; 17: pp. 243-260.

Anthony J. Nicholson, et al., "Improved Access Point Selection," MobiSys '06, Jun. 19-11, 2006, Uppsala, Sweden, pp. 233-245.

Christine E. Jones, et al., "A Survey of Energy Efficient Network Protocols for Wireless Networks," Wireless Networks 7, pp. 343-358, 2001.

* cited by examiner

|  | SLOT 1 | SLOT 2 | SLOT 3 | SLOT 4 | SLOT 5 | SLOT 6 | SLOT 7 | SLOT 8 | SLOT 9 |
| --- | --- | --- | --- | --- | --- | --- | --- | --- | --- |
| AP1 | X | [X] | | | | | | | |
| AP2 | [X] | | | | | | | | |
| AP3 | X | X | | | | | | | |
| AP4 | X | X | | | | | | | X |
| AP5 | X | | | | | | | | |
| AP6 | | X | X | [X] | | | | X | |
| AP7 | | | | X | X | [X] | X | | [X] |
| AP8 | | X | | X | X | X | [X] | [X] | |
| AP9 | | X | X | | | | | | |
| AP10 | | | | | X | X | | X | X |
| AP11 | | | | | | X | | | X |
| AP12 | | | | | | X | X | | |
| MARK | * | | | * | | | | | |

FIG. 3

METHOD AND APPARATUS FOR ASSOCIATION CONTROL IN MOBILE WIRELESS NETWORKS

BACKGROUND OF THE INVENTION

1. Technical Field

The present disclosure relates to wireless networks and, more specifically, to a method and apparatus for association control in mobile wireless networks.

2. Discussion of the Related Art

A mobile wireless network is a set of spatially distributed base stations or access points (APs) that are each connected to a network, for example, a telephone network and/or the Internet. Each AP provides a coverage area within which it is able to communicate wirelessly to a mobile terminal and thus provide the mobile terminal with network access. As the mobile terminal travels beyond the coverage area of a first AP and into the coverage area of a second AP, network communication is handed off from the first AP to the second AP such that the mobile terminal may retain network access even when in motion.

Examples of mobile wireless networks include mobile telephone networks such as CDMA and GSM networks, networks based on IEEE 802.11 standards (WiFi), networks based on IEEE 802.16 standards (WiMAX), etc.

Handoff is performed as the mobile terminal travels beyond the coverage area of the AP currently providing network access. Specifically, handoff is performed before the signal received by the mobile terminal from the AP degrades below a point where network access is compromised. This point may be determined by monitoring the signal strength of the current AP and initiating a handoff when the signal strength of the current AP falls below a signal strength of an available AP.

Handoff of network access from one AP to another AP involves, among other concerns, determining which AP to handoff network access to. For example, the mobile terminal may be within the coverage area of multiple APs and there may be a selection of APs that may receive the handoff.

Conventionally, network access is handed off to the AP with the strongest signal. In such a situation, the mobile terminal may analyze the signal strength of each available AP and select a desired AP based on the strongest signal. Accordingly, as the mobile terminal leaves the coverage area of a first AP, network access may be handed off to another AP without a loss of network access.

However, frequent handoff of network access may be problematic for a mobile terminal. For example, handoffs may potentially cause interruption of data transfer across the network. When data transfer is involved in real-time communication service, such as a voice call, interruption of data transfer may be undesirable potentially leading to noticeable delays in communication. Additionally, interruption of data transfer may lead to unacceptable delays in interactive applications that rely upon network-based communication. Moreover, the process of handing off network access may be expensive in terms of battery drain and computational economy, both of which may be scarce in mobile terminals.

Approaches have been developed to minimize latency in handoffs. For example, S. Pack and Y. Choi, *"Fast Inter-AP Handoff using Predictive Authentication Scheme in a Public Wireless LAN,"* in proc. IEEE Networks Conference, Atlanta, Ga., August 2002; M. Shin, A. Mishra, and W. Arbaugh, *"Improving the Latency of 802.11 Hand-offs using Neighbor Graphs,"* in Proc. ACM MobiSys, Boston Mass., June 2004; A. Mishra, M. Shin, and W. Arbaugh, *"Context Caching using Neighbor Graphs for Fast Handoffs in a Wireless Network,"* in Proc. IEEE Infocom, Hong Kong, China, March 2004; and I. Ramani and S. Savage, *"SyncScan: Practical Fast Handoff for 802.11 Infrastructure Networks,"* in Proc. IEEE Infocom, Miami, Fla., March 2005; each of which are herein incorporated by reference. According to such approaches, channel scanning time and handoff latency may be minimized. However, such approaches have not been concerned with minimizing the number of handoffs, and accordingly, expense of battery drain and computational economy associated with handoffs is not minimized.

SUMMARY

A method for association of a mobile terminal with an access point (AP), includes determining a set of presently available APs, determining which of the set of presently available APs were also within a set of previously available APs, selecting an AP from among the intersection of the set of presently available APs and the set of previously available APs, and associating the mobile terminal with the selected AP.

The set of presently available APs may include APs of a wireless network that have a coverage area that encompasses the mobile terminal at the point in time when the set is determined.

The previously available APs may be APs of a wireless network that have a coverage area that encompassed the mobile terminal at a particular point in time before the point in time when the set is determined.

The selecting of an AP from among the intersection of the set of presently available APs and the set of previously available APs may include making a random selection from among the intersection.

The selecting of an AP from among the intersection of the set of presently available APs and the set of previously available APs may include selecting an AP of the intersection whose signal is most strongly received by the mobile terminal.

The association of the mobile terminal with the selected AP may be an initial association when the mobile terminal has no previous association and the association of the mobile terminal with the selected AP may be a handoff when the mobile terminal has a previous association.

The previously available APs may have been APs available during a most recently marked time slot that occurred when the intersection of the set of presently available APs and the set of previously available APs was a null set.

A method for association of a mobile terminal with an access point (AP) includes determining a set of available APs at a first location, determining a set of available APs at a second location, retrieving history data pertaining to a transition between the set of available APs at the first location and the set of available APs at the second location, the history data including association duration information indicating how long each of the available APs at the first location remained available, selecting an AP that has the greatest association duration from among the set of available APs at the second location, and associating the mobile terminal with the selected AP.

The set of available APs at the first location may include APs of a wireless network that have a coverage area that encompasses the mobile terminal when located at the first location and the set of available APs at the second location includes APs of the wireless network that have a coverage area that encompasses the mobile terminal when located at the second location.

The second location may be a present location of the mobile terminal and the first location is a previous location of the mobile terminal and the history data pertains to a prior transition of the mobile terminal from the first location to the second location.

Selecting an AP that has the greatest association duration from among the set of available APs at the second location may include randomly selecting between two or more APs that have the same association duration.

Selecting an AP that has the greatest association duration from among the set of available APs at the second location may include selecting between two or more APs that have the same association duration based on the AP whose signal is most strongly received by the mobile terminal.

The association of the mobile terminal with the selected AP may be an initial association when the mobile terminal has no previous association and the association of the mobile terminal with the selected AP may be a handoff when the mobile terminal has a previous association.

A method for association of a mobile terminal with an access point (AP) includes determining a set of available APs, calculating an extent of uninterrupted reception for each of the available APs, selecting an AP from among the set of available APs that has a greatest extent of uninterrupted reception, and associating the mobile terminal with the selected AP.

The set of available APs may include APs of a wireless network that have a coverage area that encompasses the mobile terminal at the point in time when the set is determined.

The extent of uninterrupted reception may be calculated for each of the available APs by determining how long the mobile terminal will remain within the coverage area of each of the APs given a known or estimated trajectory of the mobile terminal.

Selecting an AP from among the set of available APs that has a greatest extent of uninterrupted reception may include randomly selecting an AP from among APs that have an identical extent of uninterrupted reception.

Selecting an AP from among the set of available APs that has a greatest extent of uninterrupted reception may include selecting an AP having a greatest signal strength from among APs that have an identical extent of uninterrupted reception.

The association of the mobile terminal with the selected AP may be an initial association when the mobile terminal has no previous association and the association of the mobile terminal with the selected AP may be a handoff when the mobile terminal has a previous association.

A method for association of a mobile terminal with an access point (AP) includes determining a set of available APs, determining which of the set of available APs has a coverage area that is likely to encompass the mobile terminal for the greatest period of time or distance, selecting the AP from among the available APs that has the coverage area that is likely to encompass the mobile terminal for the greatest period of time or distance, and associating the mobile terminal with the selected AP.

BRIEF DESCRIPTION OF THE DRAWINGS

A more complete appreciation of the present disclosure and many of the attendant features thereof will be described as the same becomes better understood by reference to the following detailed description when considered in connection with the accompanying drawings, wherein:

FIG. 3 is a diagram showing an application of a Lookback approach applied to a network of multiple access points (APs) that may be used to provide network access to a mobile terminal in accordance with an exemplary embodiment of the present invention;

DETAILED DESCRIPTION OF THE DRAWINGS

Figure 1:
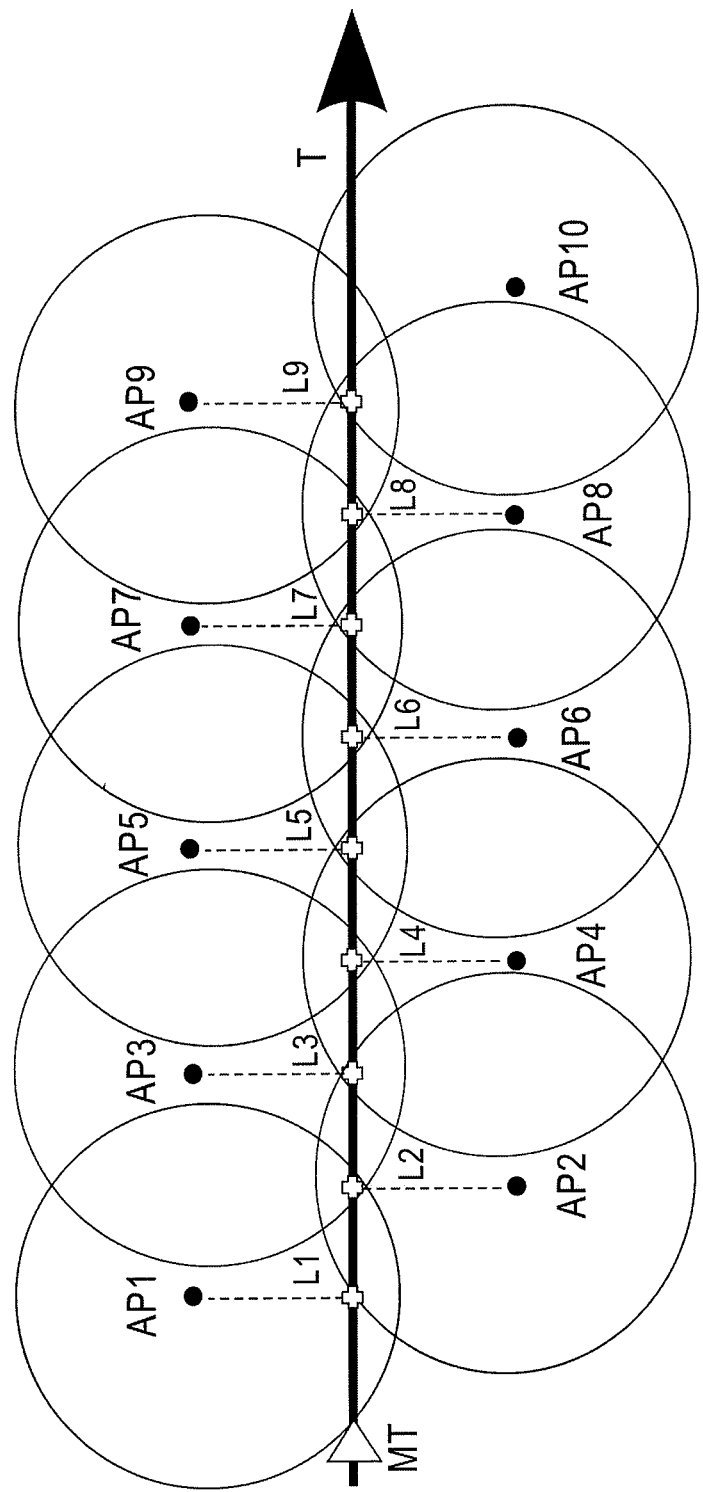
FIG. 1 is a diagram showing network of multiple access points (APs) that may be used to provide network access to a mobile terminal in accordance with an exemplary embodiment of the present invention.

In describing the exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention provide approaches for minimizing the frequency of handoffs as a mobile terminal roams through a mobile communications network. The frequency of handoffs may be minimized by utilizing one or more of the approaches discussed herein for selecting a desired AP to receive handoff. By minimizing the frequency of handoffs, the quality of mobile network communication may be maximized while battery power and computational resources of the mobile terminal may be conserved.

As discussed above, the conventional approach for selecting an AP to receive handoff includes determining which of the available APs provides the strongest signal to the mobile terminal and then handing off network access to the AP that has been determined to provide the strongest signal. The strength of the signal may primarily depend on the distance between the mobile terminal and the access point, but other factors such as obstructions and atmospheric conditions may play a role as well. For the purposes of simplifying discussion, it will be assumed herein that signal strength is wholly a factor of distance between the mobile terminal and the access point.

Thus according to the conventional approach, when a mobile terminal roaming within a network of APs leaves the coverage area of a particular AP, network access is handed off to the AP that is closest to the mobile terminal at that moment. FIG. 1 is a diagram showing network handoff. The trajectory of the mobile terminal is assumed to be linear for the benefit of description.

In FIG. 1, the mobile terminal MT follows a trajectory T. At location L1 along the trajectory T, the mobile terminal MT determines that while it is within the coverage area of a first access point AP1 and a second access point AP2, a network connection is established with AP1 because at L1, the signal from AP1 is stronger than the signal from AP2. Thus network access is initially provided by AP1.

As the mobile terminal MT proceeds to L2, and the mobile terminal MT is within the coverage areas of AP1, AP2 and AP3, the mobile terminal MT determines that the signal is strongest from AP2. Thus network access is handed off from AP1 to AP2 (handoff 1).

As the mobile terminal MT proceeds to L3, and the mobile terminal MT is within the coverage areas of AP2, AP3 and AP4, the mobile terminal MT determines that the signal is strongest from AP3. Thus network access is handed off from AP2 to AP3 (handoff 2).

As the mobile terminal MT proceeds to L4, and the mobile terminal MT is within the coverage areas of AP3, AP4 and AP5, the mobile terminal MT determines that the signal is strongest from AP4. Thus network access is handed off from AP3 to AP4 (handoff 3).

As the mobile terminal MT proceeds to L5, and the mobile terminal MT is within the coverage areas of AP4, AP5 and AP7, the mobile terminal MT determines that the signal is strongest from AP5. Thus network access is handed off from AP4 to AP5 (handoff 4).

As the mobile terminal MT proceeds to L6, and the mobile terminal MT is within the coverage areas of AP5, AP6 and AP7, the mobile terminal MT determines that the signal is strongest from AP6. Thus network access is handed off from AP5 to AP6 (handoff 5).

As the mobile terminal MT proceeds to L7, and the mobile terminal MT is within the coverage areas of AP6, AP7 and AP8, the mobile terminal MT determines that the signal is strongest from AP7. Thus network access is handed off from AP6 to AP7 (handoff 6).

As the mobile terminal MT proceeds to L8, and the mobile terminal MT is within the coverage areas of AP7, AP8 and AP9, the mobile terminal MT determines that the signal is strongest from AP8. Thus network access is handed off from AP7 to AP8 (handoff 7).

As the mobile terminal MT proceeds to L9, and the mobile terminal MT is within the coverage areas of AP8, AP9 and AP10, the mobile terminal MT determines that the signal is strongest from AP9. Thus network access is handed off from AP8 to AP9 (handoff 8).

Accordingly, as the mobile terminal MT progresses along the trajectory T from L1 to L9, there are a total of 8 handoffs performed when using the conventional approach for handing off.

To minimize the frequency associated with access point handoff, exemplary embodiments employ techniques for selecting access points that are most likely to maximize duration of association. Among the various techniques for selecting among multiple APs contemplated by exemplary embodiments of the present invention, three exemplary techniques are discussed in detail below. These techniques are Lookahead, Lookback, and Track. The Lookahead approach involves an offline approach wherein the trajectory of the mobile terminal is known or may be assumed. The Lookback and Track approaches involve online approaches wherein the trajectory of the mobile terminal is unknown.

Lookahead Approach

As discussed above, the Lookahead approach to AP selection is an offline approach where the trajectory of the mobile terminal is known or may be assumed. For example, the Lookahead approach may be used where the mobile terminal is moving along a knowable path, such as in a train along a track or an automobile along a highway. The mobile terminal's known trajectory need not be a straight line, all that is needed is that the trajectory be known or assumed. The trajectory of the mobile device may either be preprogrammed by a user or determined/estimated by the mobile device, for example, by analyzing a pattern of past AP association. Global positioning service technology and/or a mapping of the location of available APs may also be used in figuring out the trajectory of the mobile terminal, although this information is not required in all exemplary embodiments.

In performing the lookahead approach, handoff is triggered by the dropping off of signal strength below a predetermined threshold below which it is known that signal strength is undesirable. When the handoff is triggered, the mobile terminal may determine a list of available APs whose signal strength is above the predetermined threshold. For each available AP, the known and/or estimated trajectory is used to determine a duration value representing the extent of uninterrupted reception above the predetermined threshold either in terms of time (where velocity of the mobile terminal is known) or in terms of distance. Then, the available AP with the greatest measure of uninterrupted reception is selected and network access is handed off to the selected AP.

In determining the extent of uninterrupted reception above the predetermined threshold, proximity may be used as a proxy for reception strength, and reception strength above a predetermined threshold may be expressed as a maximum distance from a particular access point. Where additional data is available, such as obstructions and atmospheric conditions that may affect a signal's ability to carry, this data may be used to augment the calculations.

Determining the extent of uninterrupted reception may be performed for discrete time slots of predetermined time intervals, for example, several seconds. Using the trajectory of the mobile terminal, the level of estimated reception for each available access point may be calculated for a predetermined number of time slots, for example 10 time slots.

For example, it may be determined for each available access point, what the distance will be between that access point and the mobile terminal at each time slot. If a particular AP is determined to be within the predetermined distance of the mobile terminal for all 10 future time slots, then the extent of uninterrupted reception for that AP is 10. If a particular AP is determined to be within the predetermined distance of the mobile terminal for the first 5 time slots and then beyond the predetermined distance for the next 5 time slots then the extent of uninterrupted reception for that AP is 6. However, if a particular AP is determined to be within the predetermined distance of the mobile terminal for the first 3 time slots, beyond the predetermined distance for the next 2 time slots and then back within the predetermined distance of the mobile terminal for the remaining 5 time slots, then the extent of uninterrupted reception for that AP is 3, because it is only within the first 3 time slots that uninterrupted reception from the initial time slot is achieved.

Accordingly, the AP with the longest measure of uninterrupted reception is selected and network access is handed off to the selected AP.

Thus returning to FIG. 1, the Lookahead approach for AP selection may be used to minimize the number of handoffs. For example, at location L1 along the trajectory T, the mobile terminal MT determined that it is within the coverage area of AP1 and AP2. Based on the trajectory T, for AP1, reception will be present at L1, present at L2, and not present at L3. Thus, the extent of uninterrupted reception for AP1 is 2. Meanwhile, for AP2, reception will be present at L1, L2 and L3. Thus the extent of uninterrupted reception for AP2 is 3. Because the extent of uninterrupted reception for AP2 exceeds the comparable figure for AP1, AP2 is selected and thus network access is initially provided by AP2.

As the mobile terminal MT proceeds to L2 and L3, no handoff is performed.

As the mobile terminal MT proceeds to L4, and reception from AP2 falls bellow the threshold level, the MT determines that it is within the coverage area of AP3, AP4 and AP5. Based on an analysis similar to the analysis described above, AP5 is selected for having the greatest extent of uninterrupted reception and handoff is performed to AP5 (handoff 1).

As the mobile terminal MT proceeds to L5 and L6, no handoff is performed.

As the mobile terminal MT proceeds to L7, and the reception from AP5 falls bellow the threshold level, the MT determines that it is within the coverage area of L6, L7 and L8. Based on an analysis similar to the analysis described above, AP8 is selected for having the greatest extent of uninterrupted reception and handoff is performed to AP8 (handoff 2).

As the mobile terminal MT proceeds to L8 and L9, no handoff is performed.

Accordingly, as the mobile terminal MT progresses along the trajectory T from L1 to L9, there are a total of 2 handoffs performed when using a Lookahead approach according to an exemplary embodiment of the present invention. This stands in contrast to the 8 handoffs used according to the conventional approach.

Figure 2:
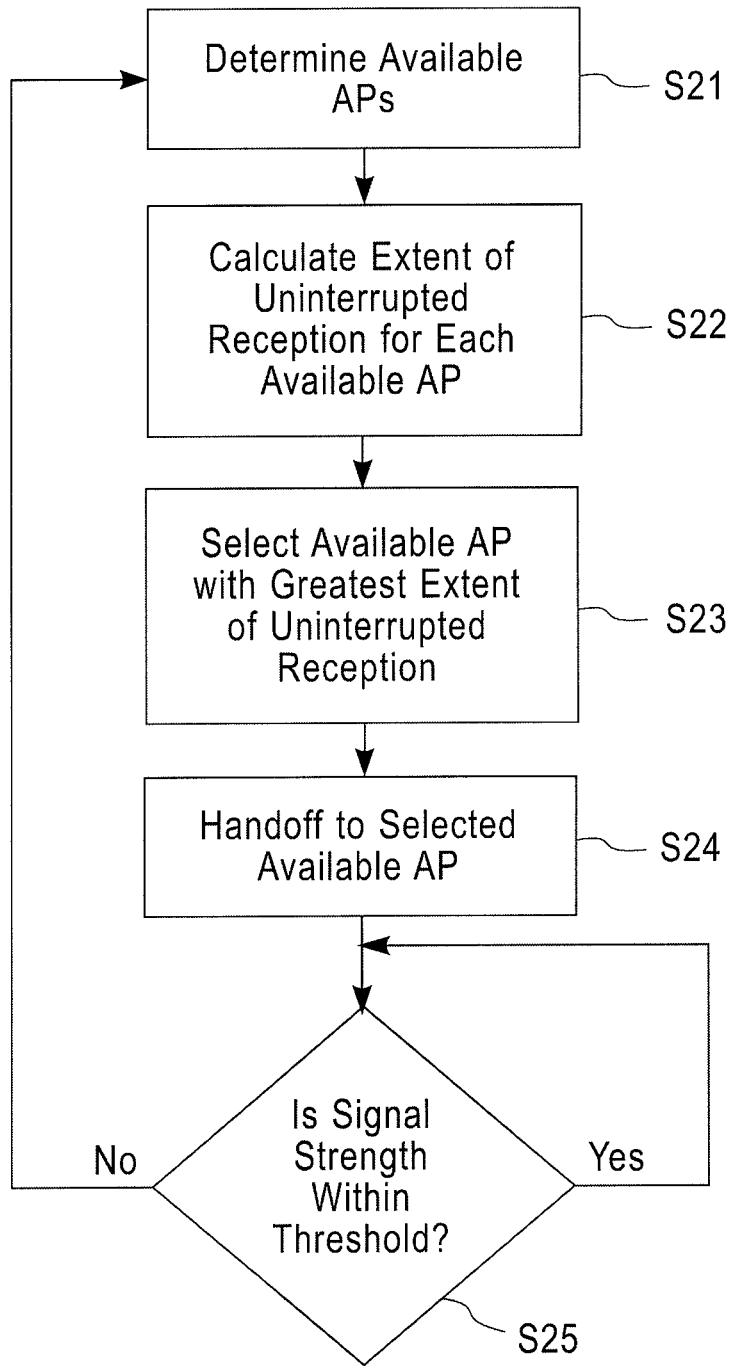
FIG. 2 is a flowchart illustrating a method for performing AP handoff using a Lookahead approach according to an exemplary embodiment of the present invention.

FIG. 2 is a flowchart illustrating a method for performing AP handoff using a Lookahead approach according to an exemplary embodiment of the present invention. First, the mobile terminal may determine what APs are available (Step S21). Then, for each available AP, the mobile terminal may calculate the extent of uninterrupted reception based on a known or assumed trajectory (Step S22). The extent of uninterrupted reception may be calculated as the length of time and/or travel distance that the mobile terminal will remain within the coverage area of the particular AP without interruption, starting from the time and location where the mobile terminal determined what APs were available. The available AP with the greatest extent of uninterrupted reception may then be selected (Step S23). Where there are multiple APs with an identical greatest extent of uninterrupted reception, selection may be arbitrary from among the group of APs that share the greatest extent of uninterrupted reception. Alternatively, selection from among the group of APs that share the greatest extent of uninterrupted reception may be based upon which of the group of APs has the greatest signal strength. Where the AP is selected for the purposes of establishing initial network access, initial network access may be established with the selected AP. Where the AP is selected for the purposes of handing off network access, network access may be handed off to the selected AP (Step S24). After network access is established and/or handed off, the signal strength may be monitored to determine if the signal strength is within a predetermined threshold (Step S25). For as long as the signal strength is within the predetermined threshold (Yes, S25), no handoff is necessary and monitoring may continue (Step S25). When the signal strength falls below the predetermined threshold (No, S25), then the handoff process may be repeated at Step S21.

Lookback Approach

As discussed above, the Lookback approach to AP selection is an online approach where the trajectory of the mobile terminal is unknown.

Even though the trajectory of the mobile terminal is unknown, exemplary embodiments of the present invention may provide techniques for minimizing the number of handoffs. The lookback approach works on the assumption that as the mobile terminal roams, an access point that has a recent history of covering the mobile terminal will be more likely to continue to cover the mobile terminal than an access point that has just begun to cover the mobile terminal.

This concept may be described by example. The chart of FIG. 3 shows how the lookback approach may be performed with respect to a particular example. In this example, it is assumed that the mobile terminal is traveling along an unknown trajectory. There are 12 potential APs numbered AP1 through AP12. There are also 9 time slots. A time slot may be defined in a number of ways. For example, a time slot may be a fixed time interval. Alternatively, time slots may depend on the occurrence of a particular event, such as when a scan for available APs is performed. According to this example, every time the mobile terminal performs another scan for available APs, a new time slot has begun. Under some implementations of this approach, a new scan is performed whenever a handoff is required, however, there may be other events that trigger a scan as well.

In FIG. 3, an "x" indicates which APs are available at which time slots, for example, AP1 is available to the mobile terminal at time slot 1, while AP12 is not available at time slot 1. Square brackets "[ ]" are used to indicate which of the available APs is the associated AP at any given time slot.

Some time slots are considered to be "marked" time slots, these time slots receive an asterisk "*" in the "MARK" row. The concept of marking is described in detail below.

At time slot 1, there is no previous association so an initial association is determined. The initial association may be determined according to either a random selection from among the available APs or by selecting the AP with the strongest signal. In the example shown in FIG. 3, AP2 is so selected and an initial association is begun.

The time slot in which an initial association is begun should be marked and thus time slot 1 is a marked time slot. As the mobile terminal roams, its position changes, and in time slot 2, the associated AP, AP2 is no longer available. Because the associated AP is no longer available, handoff is performed.

The selection of the appropriate AP to handoff to is the subject of the lookback approach. According to the lookback approach, network access is handed off to an AP that is in the intersection of the set of currently available APs and the set of APs that were available at the last marked time slot. Where this set includes more than one AP, the selection from among this intersection set may either be arbitrary, according to the strongest signal, or according to any other means.

According to the example shown on FIG. 3, at time slot 2, the set of currently available APs is {AP1, AP3, AP4, AP6, AP9} and the set of APs that were available at the last marked time slot is {AP1, AP2, AP3, AP4, AP5}. Thus, the set of intersection is {AP1, AP3, AP4}. In this example, AP1 is selected from among the intersection set.

An association may last until the associated AP is no longer available. In the example at time slot 3, the currently associated AP is still available and thus association is maintained. However, at time slot 4, AP1 is no longer available and a new AP is selected for handoff. This time, the set of available APs is {AP6, AP7, AP8, AP9} and the set of APs available at the last marked time slot is {AP1, AP2, AP3, AP4, AP5}, thus the intersection set is null. According to this implementation of the lookback approach, when the intersection set is found to be null, the current time slot is marked.

When the current time slot is marked, the intersection of the currently available APs and the APs available at the most recently marked slot are identical and thus any available time slot may be selected. In this example, AP6 is so selected. Then because AP6 remains available at time slot 5, no handoff occurs.

At time slot 6, the associated AP is no longer available and thus a new AP is selected for handoff. The set of currently available APs is {AP7, AP10, AP11, AP12} and the set of APs available at the most recently marked time slot is {AP6, AP7, AP8, AP9}, thus the intersection set is {AP7}. Accordingly, AP7 is selected to receive handoff. Throughout time slots 7, 8, and 9, AP7 remains available and thus no further handoffs occur.

Figure 4:
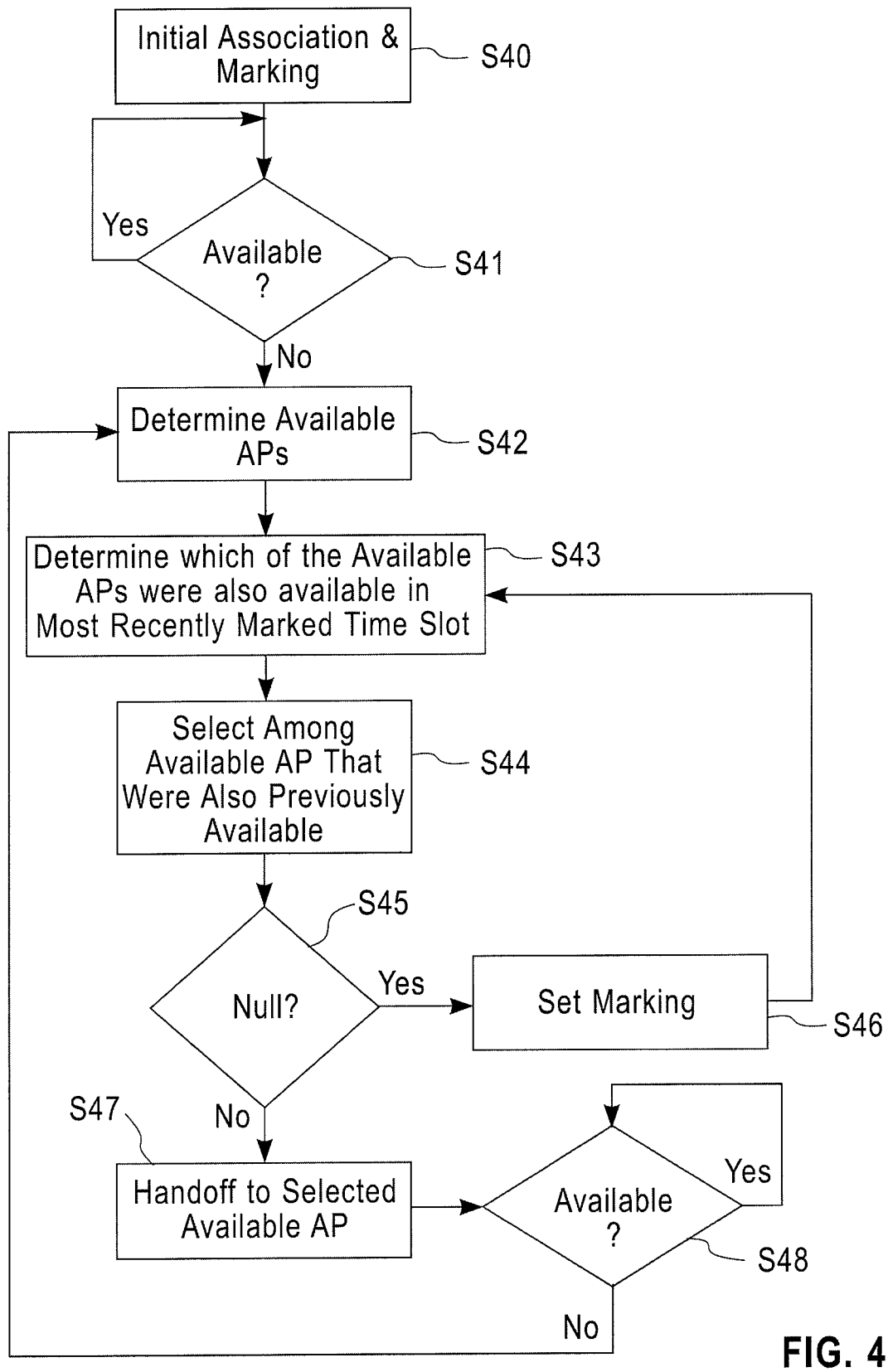
FIG. 4 is a flowchart illustrating a method for performing AP handoff using a Lookback approach according to an exemplary embodiment of the present invention.

FIG. 4 is a flowchart illustrating a method for performing AP handoff using a Lookback approach according to an exemplary embodiment of the present invention. When no prior association exists, an initial association may be made based on the presently available APs (Step S40). Selecting between the available APs may be arbitrary, may be based on strongest signal, or based on another mode of selection. Also in this step, the present time slot may be marked.

Association may continue for as long as the mobile terminal remains within the coverage area of the associated AP (Yes, Step S41). When the associated AP is no longer available (No, Step S41) then the set of currently available APs is determined (Step S42). Then it may be determined which of the set of available APs were also available at the most recently marked time slot (Step S43). This is the intersection of the presently available APs and the APs that were available at the most recently marked time slot.

If this intersection is a null set (Yes, Step S44) and there are no presently available APs that were also available at the most recently marked time slot, then the present time slot is marked (Step S45). Then the step of determining the intersection is performed again (Step S43) for the newly marked time slot.

If the intersection is not a null set (No, Step S44), then an AP may be selected from among the intersection (Step S46). Where there are multiple APs in this set, the selection between the APs may be arbitrary, based on signal strength, or by some other approach.

Then, handoff may be performed to the selected AP (Step S47). The association with the selected AP may continue for as long as the selected AP is available (Yes, Step S48). When the selected AP is no longer available (No, Step S48), then the process may return to step S42. As described above, the associated AP may be considered available for as long as its signal strength remains above a predetermined threshold level.

The Lookback approach described above is offered as an example application of the Lookback approach. This approach may be modified in many ways. For example, in the approach discussed above, the marking is set when the intersection between currently available APs and APs that were available at the most recently marked time slot is null. This aspect may be changed and another approach to marking time slots may be used. For example, every time slot may be a marked time slot and thus the selected AP may be selected from among the intersection of the currently available APs and the APs that were available at the immediately previous time slot.

While there may be exemplary situations where the Lookback approach provides comparable or perhaps even more frequent handoffs than the conventional approach, it is believed that on average, the Lookback approach provides fewer handoffs than the conventional approach in light of the real-world trajectories followed by pedestrians and vehicles that may be carrying mobile devices.

Track Approach

Another online approach to AP selection is the Track approach where the trajectory of the mobile terminal is unknown. Wireless APs periodically send out beacons that are used to make their presence known. These beacons may allow mobile terminals to establish a connection with the APs. By listening for beacons, the mobile terminal may determine what APs are available at any given moment.

Even though the trajectory of the mobile terminal is unknown, exemplary embodiments of the present invention may be trained to recognize patterns of AP availability to estimate which of the available APs is likely to have the longest period of association with the mobile terminal as it roams and thus, by associating with the AP likely to have the longest period of association, the frequency of handoffs may be reduced.

Figure 5:
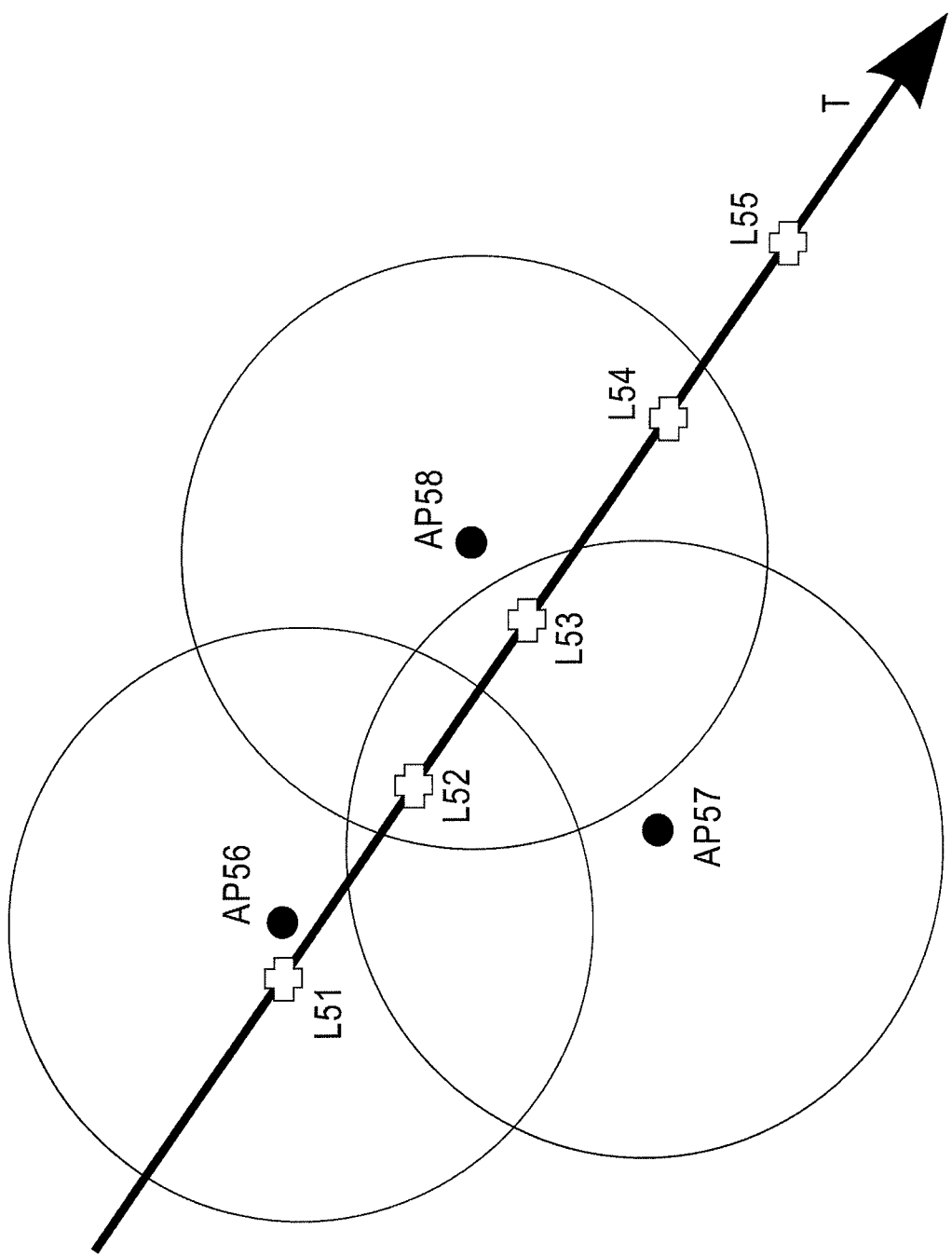
FIG. 5 is a diagram showing network of multiple access points (APs) that may be used to provide network access to a mobile terminal in accordance with an exemplary embodiment of the present invention.

One method for estimating a period of association is to use history data previously recorded by the mobile terminal as it roams. The history data may be collected by the mobile terminal by analyzing the set of available APs at set intervals and using this set of available APs to generate a location profile. For example, as seen in FIG. 5, at location L51, only access point AP56 is available. Thus the location profile is AP56. As the mobile terminal roams from location L51 to location L52 along the unknown trajectory T, AP56, AP57 and AP 58 are all available. Thus the location profile becomes AP56, AP57 and AP58. The transition from location profile "AP56" to location profile "AP56, AP57 and AP58" is a transition state that may be recorded. Then, as the mobile terminal continues along its trajectory, it is observed that at location L53, AP56 is no longer available while AP57 and AP58 continue to be available. Thus it is recorded that at the transition state from location profile "AP56" to location profile "AP56, AP57 and AP58," AP56 has an association duration of ½ interval. The association duration is said to be ½ because it is known that association with AP56 is available at L51 and unavailable at L52, because it may not be known at precisely what point the AP becomes unavailable, it is sufficient to estimate the association duration to be ½.

Then, as the mobile terminal roams from location L53 to location L54, it is observed that at location L54, neither AP56 nor AP57 are available but AP58 remains available. Thus it is recorded that at the transition state from location profile "AP56" to location profile "AP56, AP57 and AP58," AP57 has an association duration of 1.5 intervals.

Then, as the mobile terminal roams from location L54 to location L55, it is observed that at location L55, none of AP65, AP57 or AP58 is available. Thus it is recorded that at the transition state from location profile "AP56" to location profile "AP56, AP57 and AP58," AP58 has an association duration of 2.5 intervals.

Figure 6:
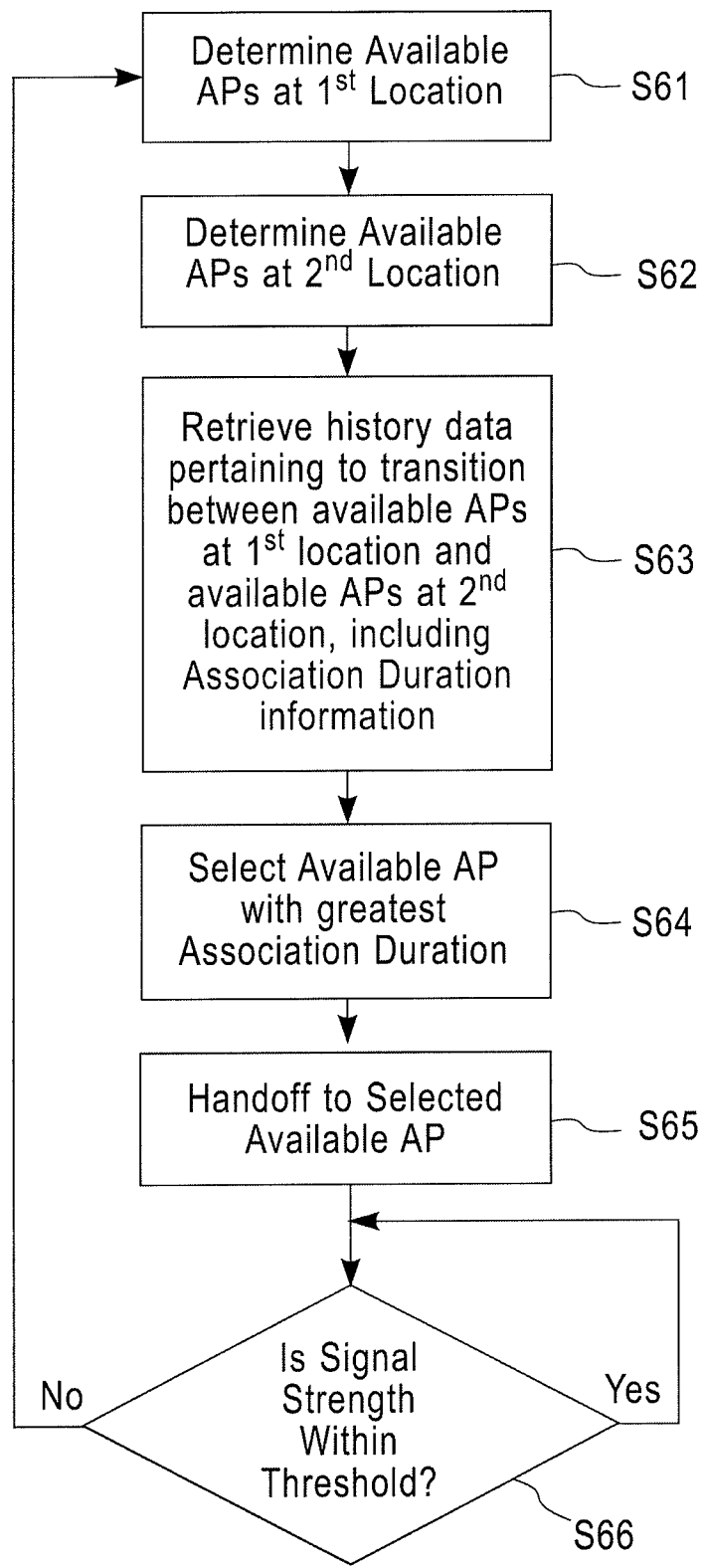
FIG. 6 is a flow chart illustrating a method for performing AP handoff using a Track approach according to an exemplary embodiment of the present invention.

The three measures of association duration are then recorded along with the details of the transition state. This information may then be used at a later time when the mobile terminal again encounters the transition state from location profile "AP56" to location profile "AP56, AP57 and AP58." Because this transition state is now a known state, the mobile terminal at location L52 may analyze the history information and use this information to select from the available access points. By referring to the history information for the known state, the available AP with the longest association duration may be selected and handoff may be performed with the selected AP. For the example depicted in FIG. 5, AP58 would be selected for handoff because at 2.5, it has the longest association duration FIG. 6 is a flow chart illustrating a method for performing AP handoff using a Track approach according to an exemplary embodiment of the present invention. First, the mobile terminal may determine a list of available APs at a first location (Step S61). Then, after roaming to a second location, the mobile terminal may determine a list of available APs at the second location (Step S62). The transition from the first set of available APs to the second set of available APs may have previously been encountered by the mobile terminal, and at that previous encounter, history data pertaining to the association durations of each AP may have been collected. Accordingly, the relevant history data pertaining to the transition between the available APs at the first location and the available APs at the second location may be retrieved (Step S63). This history data may include association duration information for each available AP. The available AP with the greatest association duration may then be selected (Step S64). Where the AP is selected for the purposes of handing off network access, the network access may be handed off to the selected AP (Step S65). After network access is established and/or handed off, the signal strength may be monitored to determine if the signal strength is within a predetermined threshold (Step S66). For as long as the signal strength is within the predetermined threshold (Yes, S66), no handoff is necessary and monitoring may continue (Step S66). When the signal strength falls below the predetermined threshold (No, S66), then the handoff process may be repeated at Step S61.

Combination Approaches

Exemplary embodiments of the present invention may combine one or more of the above-described approaches. For example, all three of the above approaches may be selectively utilized depending on the available information. For example, the Lookahead approach may be used where the trajectory of the mobile terminal is known. If the trajectory of the mobile terminal is not known and appropriate history information is available, then the Track approach may be used. However, if neither the trajectory of the mobile terminal is known nor is there appropriate history information available, and at least the set of available APs for a prior time and/or location is known then the Lookback approach may be used. Where there is not enough information to employ the Lookback approach, for example, then the conventional strongest-signal approach may be used.

Figure 7:
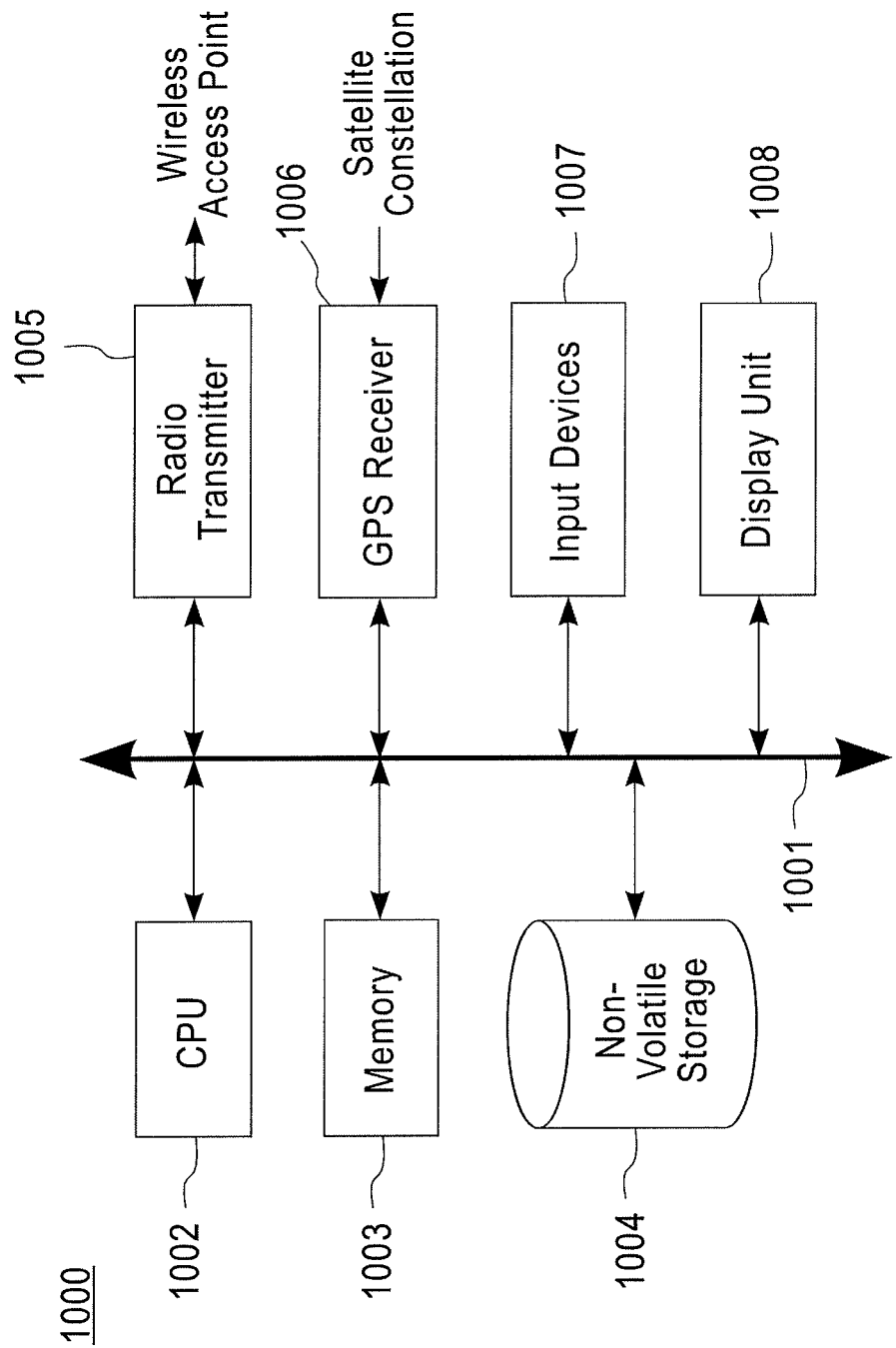
FIG. 7 shows an example of a computer system which may implement a method and system of the present disclosure.

FIG. 7 shows an example of a computer system which may implement a method and system of the present disclosure. The system and method of the present disclosure may be implemented in the form of a software application running on a computer system, for example, a mobile computer system. The software application may be stored on a recording media locally accessible by the computer system and accessible via a hard wired or wireless connection to a network, for example, a local area network, or the Internet.

The mobile computer system referred to generally as system 1000 may include, for example, a central processing unit (CPU) 1002, random access memory (RAM) 1003, a non-volatile storage unit 1004, for example, a hard drive or a flash memory, a radio transmitter, for example conforming to 802.11 standards, for interfacing with a wireless access point, a GPS receiver 1006 for receiving signals from a satellite constellation for determining a present location, one or more input devices 1007, for example, a keyboard, pointing device, camera, etc., and a display unit 1008. The mobile computer system may further include an internal bus 1001 for transmitting data between the various components.

The above specific exemplary embodiments are illustrative, and many variations can be introduced on these embodiments without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for association of a mobile terminal with an access point (AP), comprising:
   determining a set of available APs;
   calculating an extent of prior uninterrupted reception looking backwards from a point in time when the set is determined for each of the available APs over a recent history; and
   selecting an AP from among the set of available APs that has a greatest extent of prior uninterrupted reception, looking backwards from the point in time when the set is determined, and is different from a currently associated AP associating the mobile terminal with the selected AP, to the extent that an AP that is different from the currently associated AP is among the set of available APs,
   wherein the extent of uninterrupted reception, looking backwards from the point in time when the set is determined, is calculated for each of the available APs by determining how long the mobile terminal has remained within the coverage area of each of the APs given a known or estimated trajectory of the mobile terminal.

2. The method of claim 1, wherein the set of available APs includes APs of a wireless network that have a coverage area that encompasses the mobile terminal at the point in time when the set is determined.

3. The method of claim 1, wherein selecting an AP from among the set of available APs that has a greatest extent of uninterrupted reception, looking backwards from the point in time when the set is determined, includes randomly selecting an AP from among APs that have an identical extent of uninterrupted reception, looking backwards from the point in time when the set is determined.

4. The method of claim 1, wherein selecting an AP from among the set of available APs that has a greatest extent of uninterrupted reception, looking backwards from the point in time when the set is determined, includes selecting an AP having a greatest signal strength from among APs that have an identical extent of uninterrupted reception, looking backwards from the point in time when the set is determined.

5. The method of claim 1, wherein the association of the mobile terminal with the selected AP is a handoff from the currently associated AP.

* * * * *